(12) United States Patent
Roberge

(10) Patent No.: US 8,490,371 B2
(45) Date of Patent: Jul. 23, 2013

(54) MODULAR ELECTRIC DISC CUTTERBAR AND CONTROLLER

(75) Inventor: Martin J. Roberge, Saskatchewan (CA)

(73) Assignee: CNH Canada, Ltd. (CA)

( * ) Notice: Subject to any disclaimer, the term of this patent is extended or adjusted under 35 U.S.C. 154(b) by 0 days.

(21) Appl. No.: 13/332,213

(22) Filed: Dec. 20, 2011

(65) Prior Publication Data
US 2013/0152535 A1   Jun. 20, 2013

(51) Int. Cl.
*A01D 41/14*   (2006.01)
*A01D 41/127*   (2006.01)
*A01D 46/08*   (2006.01)

(52) U.S. Cl.
USPC .......................................... 56/10.2 R; 701/50

(58) Field of Classification Search
USPC .............. 56/10.2 R, 6, 13.6, 51, 503, 53
See application file for complete search history.

(56) References Cited

U.S. PATENT DOCUMENTS

| | | | |
|---|---|---|---|
| 1,799,714 A | 4/1931 | Wallace | |
| 3,070,938 A | 1/1963 | Winget | |
| 3,085,385 A * | 4/1963 | Hansen et al. | 56/7 |
| 3,830,047 A * | 8/1974 | Asumendi | 56/53 |
| 4,126,989 A | 11/1978 | Oosterling et al. | |
| 4,158,945 A | 6/1979 | Burke | |
| 4,160,356 A * | 7/1979 | Mathews | 56/192 |
| 4,232,719 A * | 11/1980 | Payton | 144/34.1 |
| 4,302,922 A | 12/1981 | Guerndt, Jr. et al. | |
| 4,455,815 A | 6/1984 | Grant | |
| 4,497,161 A * | 2/1985 | Vissers et al. | 56/13.6 |
| 4,594,842 A * | 6/1986 | Wolters et al. | 56/94 |
| 4,730,445 A | 3/1988 | Wolff | |
| 4,890,445 A * | 1/1990 | Crane | 56/13.6 |
| 5,007,234 A * | 4/1991 | Shurman et al. | 56/10.2 R |
| 5,035,107 A | 7/1991 | Scarborough | |
| 5,404,695 A * | 4/1995 | Gemelli | 56/6 |
| 5,771,669 A | 6/1998 | Langworthy et al. | |
| 5,996,323 A | 12/1999 | Campbell et al. | |
| 6,427,429 B1 | 8/2002 | Brabenec | |
| 6,484,481 B1 | 11/2002 | Langworthy et al. | |
| 6,668,528 B2 | 12/2003 | Franet et al. | |
| 6,794,834 B2 * | 9/2004 | Wakitani | 318/55 |
| 6,948,577 B2 * | 9/2005 | Wakitani et al. | 180/65.1 |
| 7,350,344 B2 | 4/2008 | Heinz et al. | |
| 7,644,564 B2 | 1/2010 | Pellenc | |
| 7,730,701 B1 * | 6/2010 | Ehrhart et al. | 56/11.9 |
| 8,056,307 B2 * | 11/2011 | Roberge | 56/6 |
| 8,099,936 B2 * | 1/2012 | Bryant et al. | 56/294 |

(Continued)

FOREIGN PATENT DOCUMENTS
GB    2118813 A  * 11/1983

*Primary Examiner* — Árpád Fábián-Kovács
(74) *Attorney, Agent, or Firm* — Patrick M. Sheldrake

(57) ABSTRACT

An electric motor-driven rotary disc cutter module for a cutterbar in an agricultural harvester. In one embodiment, each rotary disc module includes an electric motor driver. Individual cutterhead modules are staggered fore and aft along the cutterbar to provide continuous cutting across the lateral width of the cutterbar without requiring synchronized rotation of the cutterheads. Individual speed and/or rotational direction adjustment of each cutterhead enables optimized crop cutting performance and/or crop movement within the header. A control system may be included to monitor performance and manage individual operation of the cutterhead modules. In a second embodiment, a pair of cutterheads are powered by a single electric motor wherein rotational input for the second cutterhead is transferred by a simple geartrain. The pair of cutterheads is combined into a modular arrangement with the modules being staggered fore and aft on the cutterbar to provide a continuous lateral cutting swath.

14 Claims, 5 Drawing Sheets

U.S. PATENT DOCUMENTS

| | | |
|---|---|---|
| 2004/0148917 A1 | 8/2004 | Eastwood |
| 2006/0059880 A1* | 3/2006 | Angott .................. 56/10.2 A |
| 2008/0109126 A1* | 5/2008 | Sandin et al. ................ 701/23 |
| 2010/0005769 A1 | 1/2010 | Landry |
| 2010/0186361 A1* | 7/2010 | Bryant et al. ................. 56/10.7 |
| 2011/0289896 A1* | 12/2011 | Sasahara et al. ............. 56/11.9 |

* cited by examiner

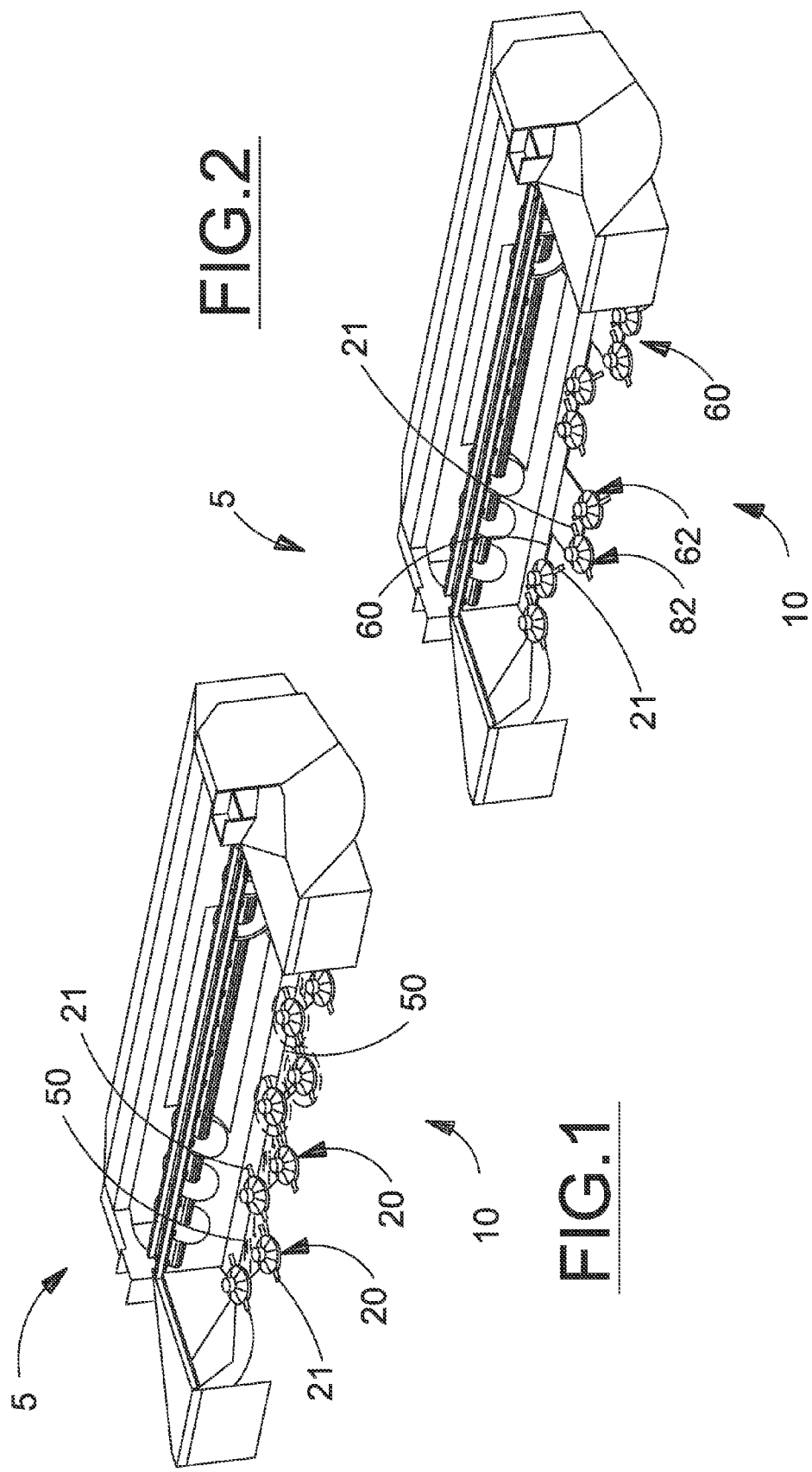

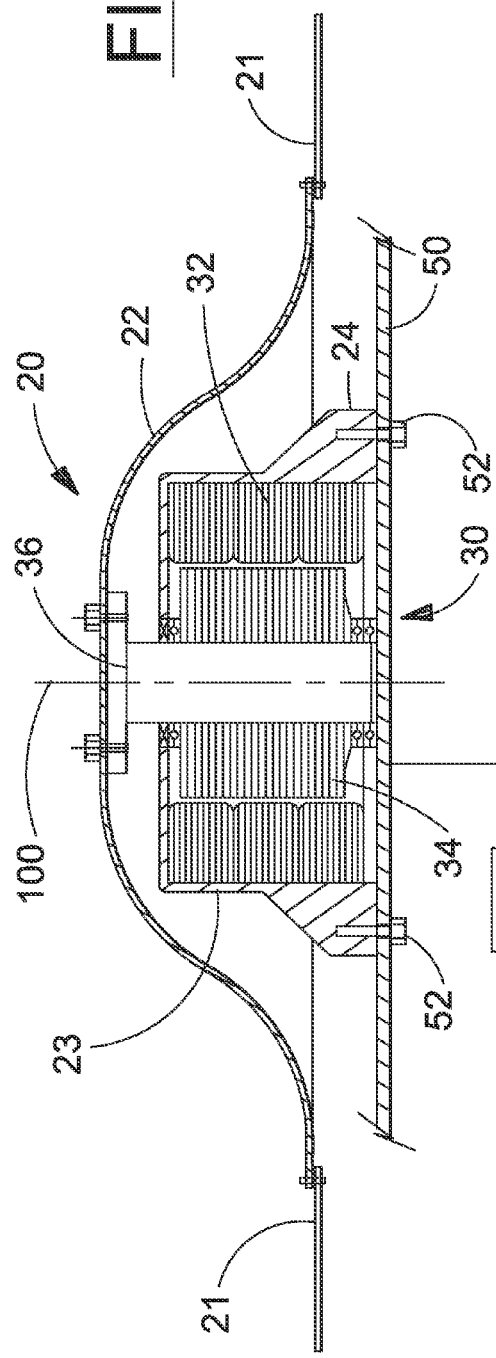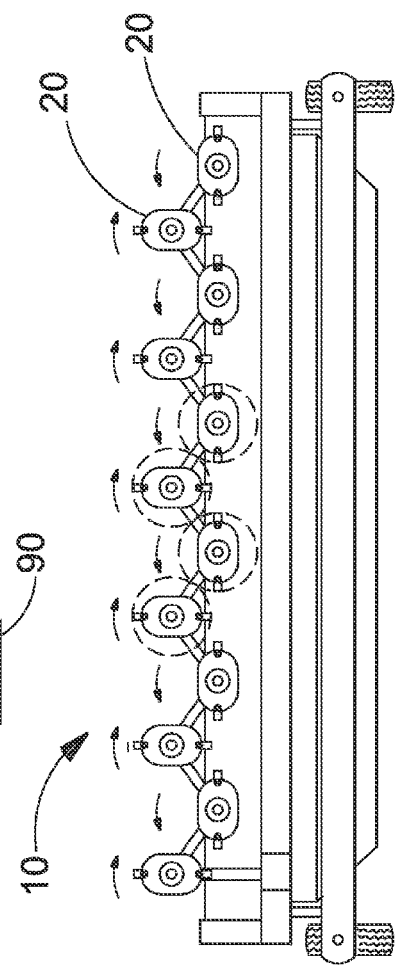

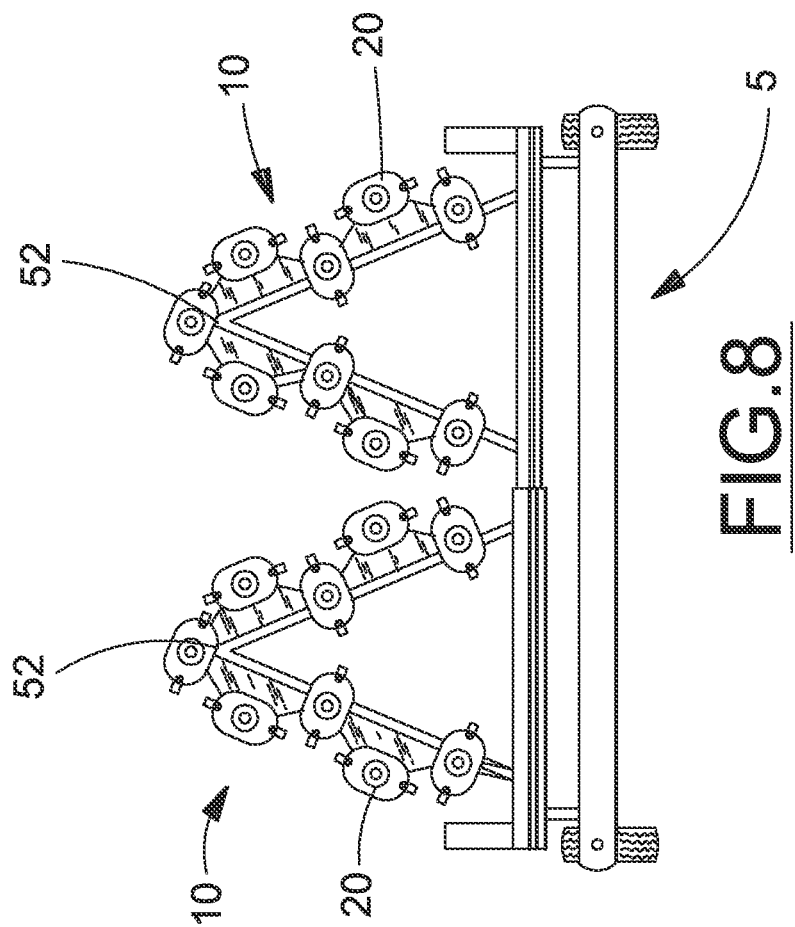
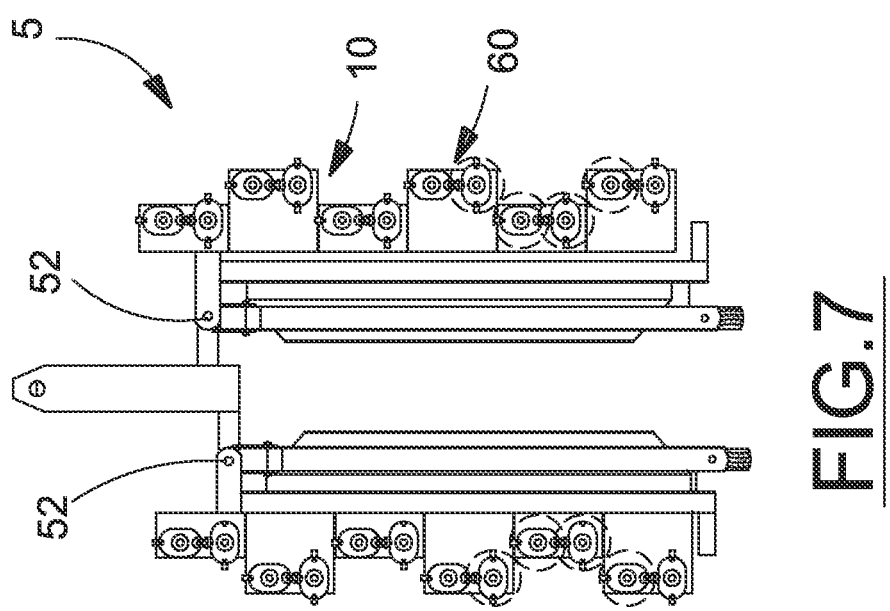

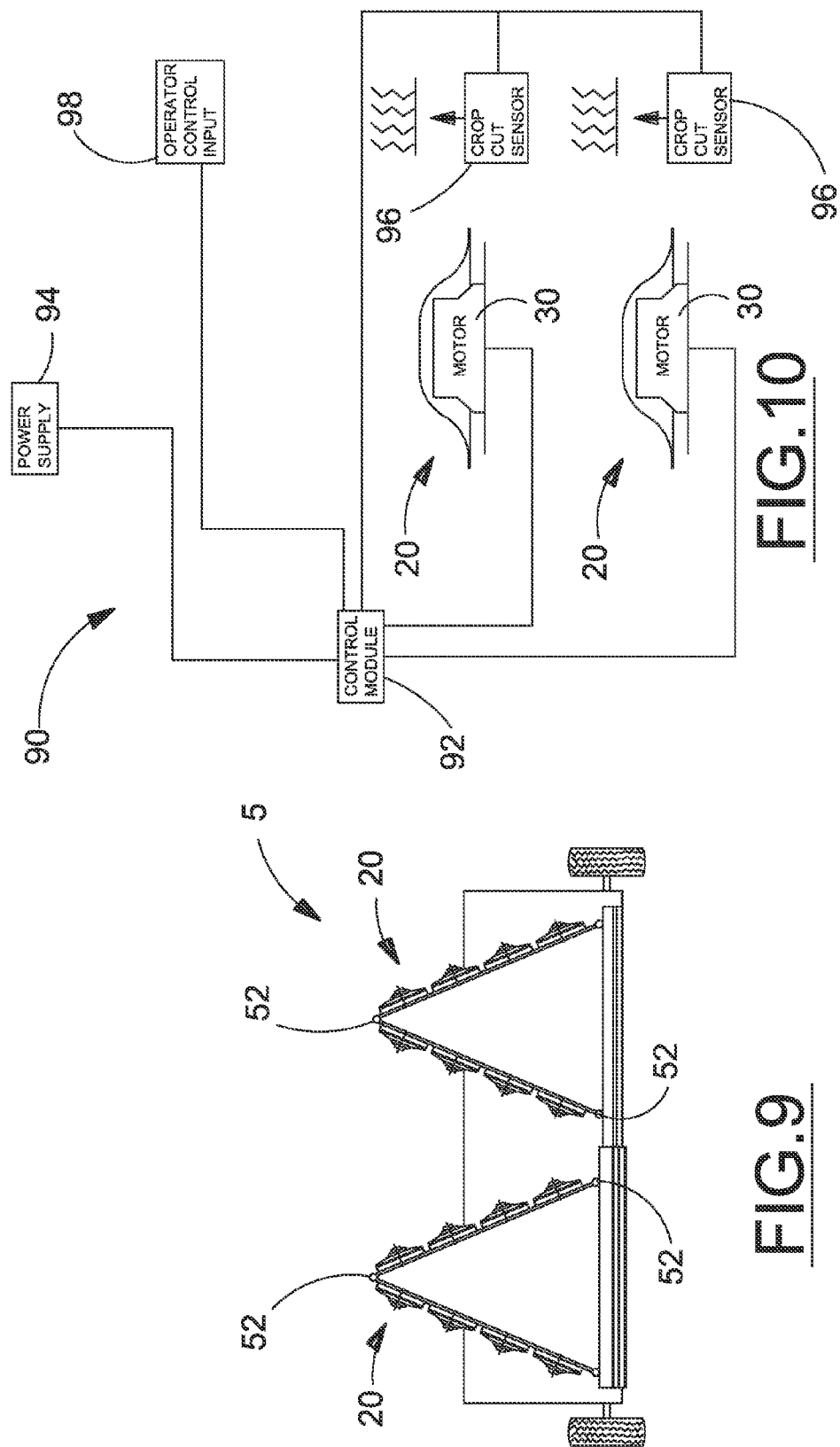

MODULAR ELECTRIC DISC CUTTERBAR AND CONTROLLER

BACKGROUND OF THE INVENTION

This invention relates generally to a machine for severing standing crops from the ground to initiate a harvesting process and, more particularly, to a rotary disc cutterbar having a preselected number of transversely oriented, electric motor powered rotatable discs with knives mounted thereon to sever standing crop by an impact action upon rotation of the discs.

Typical disc cutterbars used in agriculture include an elongated housing containing a train of meshed idler and drive spur gears, or a main power shaft or series of power shafts coupled by respective bevel gear sets, for delivering power to respective drive shafts for modular cutterheads spaced along the length of the cutterbar. The cutterheads each comprise a cutting disc including diametrically opposed cutting blades (though configurations with three or more blades are known) and having a hub coupled to an upper end of a drive shaft, the lower end of the drive shaft carrying a spur gear in the case where a train of meshed spur gears is used for delivering power, and carrying a bevel gear of a given one of the bevel gear sets in the case where a main power shaft is used. For background information on the structure and operation of some typical disc cutterbars, reference is made to U.S. Pat. No. 5,996,323, issued to Campbell, the descriptive portions thereof being incorporated herein in full by reference.

Mechanical drivetrains are typically used to direct power to each modular cutterhead on the cutterbar. The power transmission requirement and shock loadings resulting from cutter impact with rocks and other obstructions generally result in over-designed drivetrain parts capable of handling loads far greater than the loadings on an isolated rotary disc cutterhead. The additional strength in a modular cutterhead results in greater weight for the cutterbar and greater manufacturing costs. Rotation of the modular cutterheads is interlocked so that all cutterheads rotate at the same speed and at pre-determined relative directions.

Modular cutterhead designs allow an individual damaged cutterhead to be removed and replaced without affecting adjacent cutterhead modules. The modular design contains debris from gear failures within an individual module oil sump and reduces debris contamination of adjacent modules. However, replacing a single damaged cutterhead module is not an insignificant task requiring significant disassembly of the cutter bar in order to remove a damaged cutterhead from the cutterbar driveline because of intermediate drive shafts disposed between adjacent modules to transfer power laterally along the cutterbar.

It would be advantageous to have a cutterhead module powered by an electric motor that would reduce the drivetrain and module mounting complexity. Further advantages would be realized by a lighter weight electric cutterbar for an agricultural harvester. Still further advantages would be realized in an electric cutterhead module for a transverse cutterbar that would enable relative variations in cutterhead speed or rotational direction to improve cut crop flow across the cutterbar.

SUMMARY OF THE INVENTION

Accordingly, the present invention, in any of the embodiments described herein, may provide one or more of the following advantages:

It is an object of the present invention to provide an electrically driven cutterhead module for a header that allows cutterheads to be individually powered or powered in pairs thereby eliminating the need for a cutterbar mechanical drivetrain to transfer drive power across the cutterbar width.

It is a further object of the present invention to provide an electric motor driven cutterhead for a modular disc cutterbar that reduces cutterbar weight compared to a mechanically driven modular cutterbar to provide greater flexibility in repositionable cutterbar designs, including articulated cutterbars enabling large cutting widths capable of easy repositioning for transport.

It is a further object of the present invention to provide an electric motor-driven cutterhead module for a cutterbar that reduces the vertical height of the cutterbar thereby improving crop flow over the cutterbar.

It is a further object of the present invention to provide an electrically driven cutterhead module for use on a cutterbar in an agricultural harvesting header that enables variation of individual cutterhead speeds for managing crop flow through the header.

It is a further object of the present invention to provide an electrically driven cutterbar for an agricultural harvesting header that incorporates a monitoring and control system to monitor performance of the cutterbar and manage operation of the individual cutterhead modules in order to optimize cutterbar performance.

It is a still further object of the present invention to provide an electrically driven dual cutterhead module for a cutterbar having a simple gear drive connection between the cutterheads.

It is a still further object of the present invention to provide an electric motor driven rotary disc cutter module for a modular cutterbar that is durable in construction, inexpensive of manufacture, carefree of maintenance, easily assembled, and simple and effective to use.

These and other objects are achieved in accordance with the instant invention by providing an electric motor-driven rotary disc cutter module for use in a cutterbar in an agricultural harvester. In one embodiment, each rotary disc module includes an electric motor driver for the rotary cutterhead. Individual cutterhead modules are staggered fore and aft along the cutterbar to provide continuous cutting across the lateral width of the cutterbar without requiring synchronized rotation of the cutterheads to prevent contact of the knives. This configuration allows for individual speed and/or rotational direction adjustment for each cutterhead to optimize crop cutting performance and/or crop movement within the header. A control system may be included to monitor performance and manage individual operation of the cutterhead modules. In a second embodiment, a pair of cutterheads are powered by a single electric motor wherein rotational input for the second cutterhead is transferred by a simple geartrain. This design enables rotation of the pair of cutterheads to be controlled so that cutterhead spacing can be reduced while preventing knife contact. The pair of cutterheads is combined into a modular arrangement with the modules being staggered fore and aft on the cutterbar to provide a continuous lateral cutting swath.

BRIEF DESCRIPTION OF THE DRAWINGS

The advantages of this invention will be apparent upon consideration of the following detailed disclosure of the invention, especially when taken in conjunction with the accompanying drawings wherein:

FIG. 1 is a partial perspective view of an agricultural header having a rotary disc cutterbar of the type on which the present invention is useful;

FIG. 2 is a partial view of the header of FIG. 1 employing a second embodiment of the present invention;

FIG. 3 is a section view of a rotary disc cutterhead having an electric motor driver;

FIG. 4 is a partial plan view of a cutterbar used in the header of FIG. 1, incorporating the improvements of a first embodiment of the instant invention wherein each disc cutterhead modules includes an electric motor driver;

FIG. 7 is a plan view showing a first embodiment of an articulated header on which the present invention may find utility folded for non-operational transport;

FIG. 8 is a plan view showing a second embodiment of a cutterbar with one or more articulated joints folded for non-operational transport;

FIG. 9 if a forward elevation view of a third embodiment of a collapsible cutterbar with one or more articulated joints folded for non-operational transport; and FIG. 10 is a schematic diagram of one embodiment of a power and control system for managing operation of a cutterbar employing the principles of the present invention.

DESCRIPTION OF THE PREFERRED EMBODIMENT(S)

Figure 5:
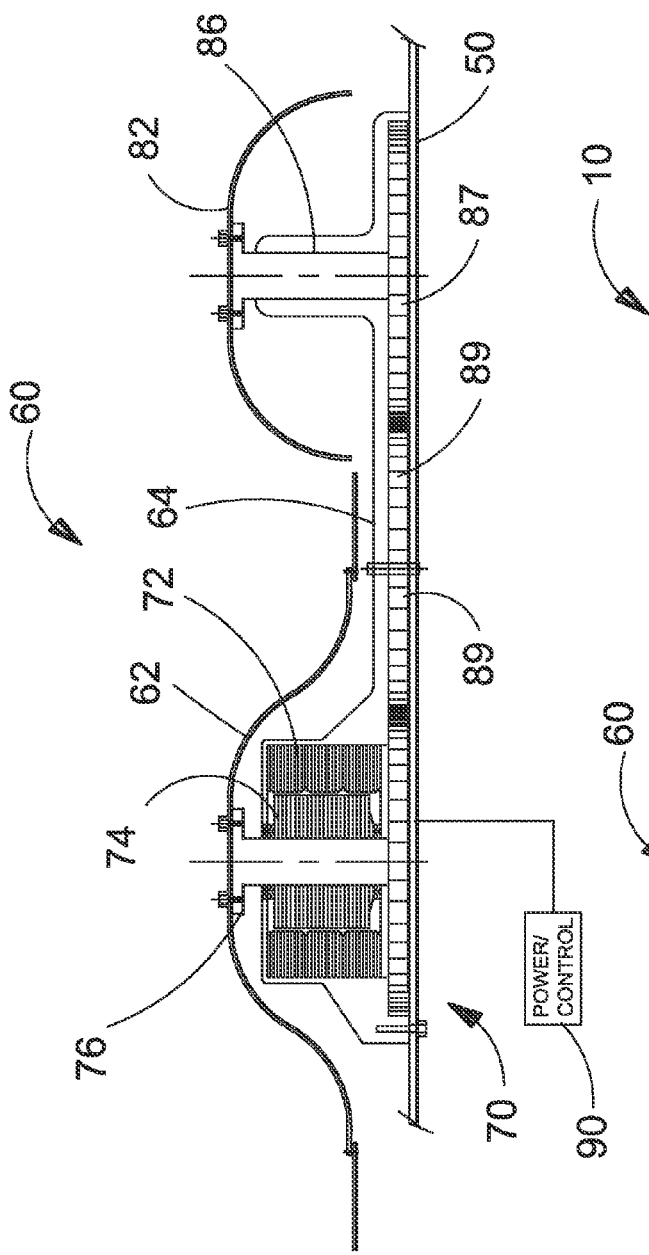
FIG. 5 is a section view of the second embodiment shown in FIG. 2 including a pair of rotary disc cutterheads driven by a single electric motor driver.

Many of the fastening, connection, processes and other means and components utilized in this invention are widely known and used in the field of the invention described, and their exact nature or type is not necessary for an understanding and use of the invention by a person skilled in the art, and they will not therefore be discussed in significant detail. Also, any reference herein to the terms "left" or "right" are used as a matter of mere convenience, and are determined by standing at the rear of the machine facing in its normal direction of travel. Likewise, "forward" and "rearward" are determined by the normal direction of travel. "Upward" and "downward" orientations are relative to the ground or operating surface as are any references to "horizontal" or "vertical" planes. Furthermore, the various components shown or described herein for any specific application of this invention can be varied or altered as anticipated by this invention and the practice of a specific application of any element may already be widely known or used in the art by persons skilled in the art and each will likewise not therefore be discussed in significant detail. When referring to the figures, like parts are numbered the same in all of the figures.

Referring now to the drawings and particularly to FIGS. 1 and 3, a header 5 having a disc cutterbar 10 is presented. Disc cutterbars have been utilized in agricultural harvesting implements for many years. Each disc cutterbar 10 includes a plurality of transversely spaced disc cutter modules 20, each configured for rotation about a generally vertical axis 100. Each disc cutter module 20 has two or three knives 21 pivotally mounted on the periphery of a rotating top cover 22 to sever standing crop from the ground through an impact action. For background information on the structure and operation of disc cutterbars, reference is made to U.S. Pat. No. 4,815,262, issued to Koch et al. and to U.S. Pat. No. 5,996,323, issued to Campbell et al., the descriptive portions thereof being incorporated herein in full by reference.

The modular disc cutterbar 10 is made up of a plurality of disc cutter modules 20 fixedly connected to a cutterbar frame 50 using conventional means, such as fasteners 52. The cutterbar frame 50 positions each cutter module to provide the desired center-to-center spacing between adjacent cutter modules. As rotation of the cutter modules 20 is not synchronized, the center-to-center spacing must be greater than the diameter of the circle of the rotating knives. In the embodiment shown, cutterbar frame 50 is a generally rigid structural frame spanning the desired width of the cutterbar.

Alternative embodiments include articulated cutterbars comprising multiple individual cutterbar sections joined by articulating joints 52 which enable the cutterbars to be repositioned, preferably folded, to reduce the overall header width for non-operational transport. The practicality of an articulated design is greatly improved by the elimination of a mechanical drivetrain within the cutterbar. FIG. 7 illustrates a simple design incorporating a single articulated joint 52 which allows the cutterbar to fold in half for trailing transport. FIG. 8 illustrates a second embodiment incorporating several articulated joints which allows the cutterbar to be collapsed in a generally horizontal plane similar to an accordion to reduce the header width for transport. A variation on the embodiment shown in FIG. 8 is illustrated in FIG. 9 wherein the cutterbar segments are raised from the horizontal plan thereby allowing the width of the cutterbar to be reduced for non-operational transport. Laterally collapsible cutterbars may find utility when combined with a collapsible crop conditioner apparatus such as that disclosed in U.S. Pat. No. 8,028,505 issued to Roberge. Other embodiments are permissible provided that, when deployed for operation, the cutterbar frame maintains the relative positions of the modules to produce the desired cutting swath and prevent unintentional impact of the knives on adjacent cutter modules.

Referring to FIGS. 3 and 4, each disc cutter module 20 includes a hollow cast housing 24 with upwardly extending sidewalls 23 enclosing a generally hollow cavity to contain an electric driver motor 30 therewithin. The housing profile is maintained as low as reasonably possible so that the resultant cutterhead module maintains a low profile. The electric motor 30 includes windings 32, and a rotor 34 connected to an output shaft 36. The output shaft 36 is supported by conventional bearings and extends to the exterior of the housing 24 for connection to the rotating top cover 22. The rotating top cover 22 is contoured to extend downwardly to partially surround the housing 24 so that the knives 21 connected to the top cover periphery are vertically positioned below the top of the housing 24 but above the base of the housing 24 where it connects to the supporting frame 50. This configuration helps to elevate crop material once cut and minimizes the protrusions below the plane of the cutting knives resulting in the ability to cut crop closer to the ground, or preferably to operate the cutterbar with increased clearance between the ground and the bottom of the cutterbar to reduce the likelihood that rock or other obstructions will be impacted and unearthed as the cutterbar passes above. It is preferable, though not essential that the cutting knives 21 for all of the modules on the cutterbar rotate generally co-planarly.

The lack of a power distributing drivetrain in the cutter modules 20 allows their height to be less compared to a conventional gear and shaft driven cutterbar. This reduction in cutterbar height combined with the rounded shape of the top covers improves crop flow over the cutterbar and generally reduces drag on the cutterbar as it is propelled forwardly thorough a standing crop.

Referring to the figures in total and specifically to FIG. 10, power for the electric motors 30 on the cutterbar is provided by a power supply 94 (e.g., electric generator) located on the tractor or prime mover propelling the header. Power may be individually regulated to each cutter module 20 or may be supplied to all motors 30 uniformly. A power control system 90 is provided for this purpose. One such system is schematically illustrated in FIG. 10. Individual motor control provides the capability for the cutting characteristics of cutterbar to be easily altered by the operator from an input console 98. The relative direction of rotation on a mechanical drive cutterbar is fixed by the power transmission apparatus, making adjustment of rotational direction of an individual cutter module impossible. Individual drive motors of the present invention enable rotational speed and rotational direction of each drive motor to be easily altered. One possible cutterbar arrangement is to rotate the outboardmost one or two cutter modules so that the cut crop is converged inwardly by the rotation of the cutterhead. Interior cutterheads may be configured for counter-rotation. Another possibility is to rotate all of the cutting modules in symmetric unison so that cut crop is urged inwardly toward the middle of the cutterbar to eliminate the need for a separate converging apparatus for some crops. Such adjustments are easily accomplished with electrically driven rotary cutterheads and impractical with known mechanical drive mechanisms.

Cutterbar performance may also be diagnosed by monitoring power input to the respective individual motors using a motor control unit. Input power supplied to drive motors compared to an expected power input value may be used to alert the machine operator to adjust vehicle travel speed or angle of attack of the cutterbar. An input power spike (e.g., sustained overcurrent or locked rotor current) on a single drive motor may be used to signal that a cutter has become jammed and will no longer rotate and initiate corrective action. Such corrective actions could include de-powering an individual motor to prevent further damage with an accompanying alert to the operator, repowering the drive motor after a brief time delay, or temporarily reversing cutterhead rotation direction to dislodge the obstruction. One or more sensors 96 may also be incorporated to examine cutting performance of the cutterbar. Input from the sensors 96 is received by the control module 92. A control algorithm then adjusts cutterhead speed, for example, to maintain optimal cutting and/or machine performance in the face of changing conditions.

In one embodiment, sensors 96 are optical sensors positioned sense the condition of the cut swath trailing the cutterbar. Detection of a ragged cut by sensors 96 would result in an output from the control module 92 to increase cutter module (drive motor) speed sense. Additional sensors such as cutter drive motor current sensors to detect motor performance, horizontal contact sensors to detect uncut crop stems, conditioning mechanism power input sensors, and/or cut crop discharge trajectory position sensors may also be incorporated with feedback to the control module 92 in order to more fully automate cutterbar performance monitoring.

As can be seen in FIG. 4, the modules 20 must be positioned on the cutterbar frame 50 in a manner that prevents overlap of the rotating periphery of the cutting knives so that knives on adjacent modules do not come into contact. Modules 20 are mounted in two spaced-apart parallel rows with adjacent modules spaced apart fore and aft. The arrangement allows the cutter modules to cut a continuous swath across the width of the cutterbar without overlapping the knives on adjacent modules. Crop flow may be improved by incorporating crop lifters or high-lift knives on the forward row of cutter modules to prevent cut crop from being cut a second time by the rearward row of cutter modules. Alternatively, rotary feeders and the like may be incorporated into the header to manage crop movement from the cutterbar through the header apparatus.

Figure 6:
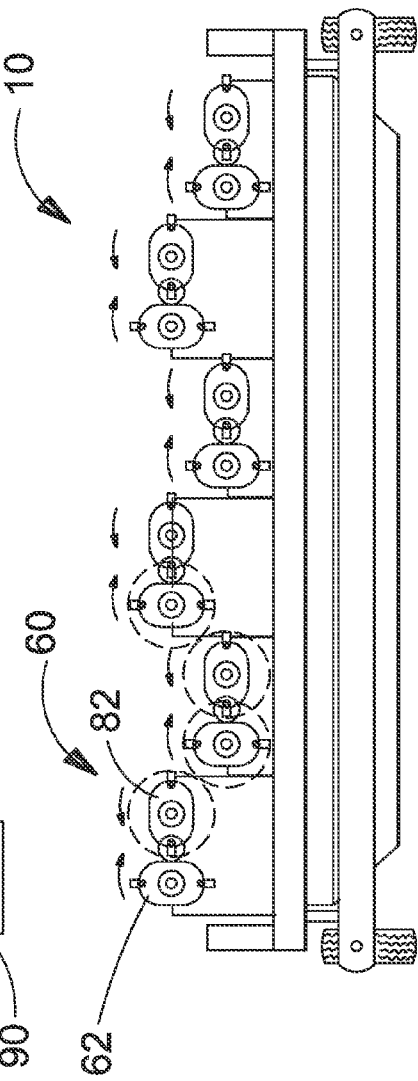
FIG. 6 is a partial plan view of a cutterbar incorporating the improvements of the second embodiment of FIG. 5 wherein an electric motor driver for a single module having two rotary disc cutterheads.

A second embodiment presented in FIGS. 2, 5 and 6 shows a cutter module 60 comprising two individual cutter modules joined and powered by a single electric motor driver 70. The first rotating top cover 62 is connected to the driver motor 70 as described above. A drive apparatus 67 is connected to the shaft 76 of the drive motor. A gear train 89 or similar power transmission apparatus receives rotational power from the drive apparatus and conveys rotational energy to a second rotating top cover 82 via shaft 86. While shown as spur gears, the drive apparatus could also comprise rotating shafts and bevel gears to convey rotational energy to the second top cover. Since rotation of the top covers 62, 82 can be synchronized, the lateral spacing therebetween can be reduced. Lateral spacing of adjacent modules 60, however, must be sufficient to prevent inadvertent contact of the knives. FIG. 6 illustrates a fore-aft staggered arrangement for the modules 60, similar to that described for individually powered modules 20 above, that provides an uninterrupted cutting swath while positioning the knives on adjacent cutter modules to prevent contact with each other.

Naturally, the invention is not limited to the foregoing embodiments, but it can also be modified in many ways without departing from the basic concepts. It will be understood that changes in the details, materials, steps and arrangements of parts which have been described and illustrated to explain the nature of the invention will occur to and may be made by those skilled in the art upon a reading of this disclosure within the principles and scope of the invention. The foregoing description illustrates the preferred embodiment of the invention; however, concepts, as based upon the description, may be employed in other embodiments without departing from the scope of the invention.

Having thus described the invention, what is claimed is:
1. A disc cutterbar for an agricultural header for severing a standing crop as the header is forwardly propelled comprising:
   an elongate, generally rigid support frame connected to the header;
   a plurality of disc cutter modules attached to and spaced apart along the support frame, each module having a low-profile electric drive motor with an upwardly oriented, rotatable output shaft, and a top cover connected to the output shaft for rotation therewith; and
   a plurality of knives connected to each top cover, rotation of the plurality of knives defining a cutting periphery, the rotation of the plurality of knives and each top cover causing cut crop material to be directed upwardly over the top cover after the crop has been severed from the ground;
   wherein the plurality of cutter modules is positioned on the frame so that the knives on the plurality of modules is generally coplanar the cutting periphery of adjacent modules does not overlap, and the rotating knives produce a continuous swath of cut crop as the cutterbar is forwardly propelled through a standing crop
   a controller and at least one input, the controller configured for separately managing at least the rotational speed of a plurality of the electric motors between multiple operating speeds from the input.
2. The disc cutterbar of claim 1, wherein the rotational speed and rotational direction of each electric motor is individually selectively adjustable through the controller and input.

3. The disc cutterbar of claim 1 wherein the controller is configured to control the modules in at least a first and second arrangement, wherein at least one module is rotated in a different direction in the first arrangement than in the second arrangement.

4. The disc cutterbar of claim 3, wherein the at least one feedback input include a selective manual input.

5. The disc cutterbar of claim 2, wherein the plurality of disc cutter modules is arranged in a transverse forward row and a transverse rearward row, the rows being parallel and spaced apart on the support frame and individual modules being staggered forwardly and rearwardly along the transverse width of the cutterbar.

6. The disc cutterbar of claim 1, wherein the electric motors are mounted to the frame such that a majority of the electric motors are located above an supper surface of the frame beneath respective top covers rigid.

7. The cutterbar of claim 1, wherein each disc cutter module further comprises a first top cover, a second top cover, and a drive transfer mechanism rotatably connecting the first and second drive covers, the first top cover being connected to the upwardly oriented, rotatable output shaft of the electric drive motor, the second top cover being spaced apart from the first top cover and rotating about a generally upwardly oriented axis parallel to the output shaft, each top cover having a plurality of knives, rotation of which defines respective, generally co-planar first and second cutting peripheries wherein the first and second cutting peripheries overlap and the drive mechanism rotationally orients the first and second top covers to intermesh respective knives thereby prevent contact between knives connected to the first top cover and knives to the second top cover.

8. The cutterbar of claim 7, wherein the drive transfer mechanism is a gear train.

9. A disc cutterbar for an agricultural header for severing a standing crop as the header is forwardly propelled comprising:
 an elongate, generally rigid support frame connected to the header;
 a plurality of disc cutter modules attached to and spaced apart along the support frame, each module having a drive motor with an upwardly oriented rotatable output shaft, and a top cover connected to the output shaft for rotation therewith; and
 a plurality of knives connected to each top cover, rotation of the plurality of knives defining a cutting periphery, the rotation of the plurality of knives and each top cover causing cut crop material to be directed upwardly over the top cover after the crop has been severed from the ground;
 wherein the plurality of cutter modules is positioned on the frame so that the knives on the plurality of modules is generally coplanar, the cutting periphery of adjacent modules does not overlap, and the rotating knives produce a continuous swath of cut crop as the cutterbar is forwardly propelled through a standing crop
 wherein the rotational speed and rotational direction of each electric motor is individually selectively adjustable;
 a controller and at least one feedback input for managing the rotational speed and direction on of each electric motor;
 wherein the at least one feedback input include a selective manual input; and
 wherein the at least one feedback input includes a sensor for generating a signal indicative of cutterbar crop severing performance, the controller receiving the signal and adjusting cutter module speed in response the signal input in accordance with a pre-determined control algorithm.

10. A disc cutterbar for an agricultural header having generally spaced-apart and opposing ends defining a header width, the cutterbar configured to sever a standing crop as the header is forwardly propelled, the disc cutterbar comprising:
 an elongate, generally rigid support frame connected to the header;
 a plurality of disc cutter modules attached to and spaced apart along the support frame, the plurality of disc cutter modules is arranged in generally parallel and transversely oriented forward and rearward rows, the rows being parallel and spaced apart on the support frame and individual modules in alternating forward and rearward positions along the transverse width of the cutterbar, each module having an electric drive motor with an upwardly oriented, rotatable output shaft, and a top cover connected to the output shaft for rotation therewith, the rotational speed and rotational direction of each electric motor being individually selectively adjustable;
 a controller and at least one feedback input for managing the rotational speed and direction of each electric drive motor to manage crop movement in the header; and
 a plurality of knives connected to each top cover, rotation of the plurality of knives defining a cutting periphery, the rotation of the plurality of knives and each top cover causing cut crop material to be directed upwardly over the top cover after the crop has been severed from the ground,
 wherein the plurality of cutter modules is positioned on the frame so that the knives are generally coplanar, the cutting periphery of adjacent modules does not overlap, the rotating knives produce a continuous swath of cut crop as the cutterbar is forwardly propelled through a standing crop, and the modules on the forward row rotate at a speed different than the speed of the modules on the rearward row to direct cut crop material upwardly over the rearward row.

11. The disc cutterbar of claim 10, wherein the at least one feedback input include a selective manual input.

12. The disc cutterbar of claim 10, wherein the at least one feedback input includes a sensor for generating a signal indicative of cutterbar crop severing performance, the controller receiving the signal and adjusting cutter module speed in response the signal input in accordance with a pre-determined control algorithm.

13. The disc cutterbar of claim 10, wherein the rigid support frame further comprises at least one articulated connection to enable the cutterbar to be folded to reduce the header width for non-operational transport.

14. The disc cutterbar of claim 13, wherein each disc cutter module further comprises a first top cover, a second top cover, and a drive transfer mechanism rotatably connecting the first and second drive covers, the first top cover being connected to the upwardly oriented, rotatable output shaft of the electric drive motor, the second top cover being spaced apart from the first top cover and rotating about a generally upwardly oriented axis parallel to the output shaft, each top cover having a plurality of knives, rotation of which defines respective, generally co-planar first and second cutting peripheries wherein the first and second cutting peripheries overlap and the drive mechanism rotationally orients the first and second top covers to intermesh respective knives thereby prevent contact between knives connected to the first top cover and knives to the second top cover.

* * * * *